United States Patent
Reichinger

(10) Patent No.: US 9,404,251 B2
(45) Date of Patent: Aug. 2, 2016

(54) METHOD FOR PROVIDING A FIRE SAFE PENETRATION IN BUILDING ELEMENT

(75) Inventor: Stephan-Ferdinand Reichinger, Essen (DE)

(73) Assignees: Rockwool International A/S, Hedehusene (DK); Deutsche Rockwool Mineralwoll GbmH & Co. OHG, Gladbeck (DE)

( * ) Notice: Subject to any disclaimer, the term of this patent is extended or adjusted under 35 U.S.C. 154(b) by 0 days.

(21) Appl. No.: 13/883,178

(22) PCT Filed: Nov. 2, 2011

(86) PCT No.: PCT/EP2011/005520
§ 371 (c)(1),
(2), (4) Date: Nov. 19, 2013

(87) PCT Pub. No.: WO2012/059221
PCT Pub. Date: May 10, 2012

(65) Prior Publication Data
US 2014/0059970 A1 Mar. 6, 2014

(30) Foreign Application Priority Data

Nov. 3, 2010 (EP) ..................................... 10014259
May 7, 2011 (EP) ..................................... 11003765

(51) Int. Cl.
*E04C 2/52* (2006.01)
*E04B 1/94* (2006.01)
(Continued)

(52) U.S. Cl.
CPC ................. *E04B 1/946* (2013.01); *F16L 5/025* (2013.01); *F16L 5/04* (2013.01); *H02G 3/0412* (2013.01); *H02G 3/22* (2013.01)

(58) Field of Classification Search
CPC ................. F16L 5/04; F16L 5/00; F16L 5/14; H02G 3/22; H02G 3/185; H02G 3/0412; E04B 1/948; E04B 1/94; E04B 1/947; E04B 1/946
USPC ...................... 52/220.1, 220.8, 232, 317, 74.1
See application file for complete search history.

(56) References Cited

U.S. PATENT DOCUMENTS 1,790,031 A * 1/1931 Vaughn ........................... 220/3.9
3,478,137 A * 11/1969 Barshefsky et al. ........... 264/118
(Continued)

FOREIGN PATENT DOCUMENTS

| DE | 3510186 A1 * | 3/1985 |
| DE | 3918892 C1 | 11/1990 |

(Continued)

*Primary Examiner* — Adriana Figueroa
(74) *Attorney, Agent, or Firm* — John Wilson Jones; Jones & Smith, LLP

(57) ABSTRACT

The invention relates to a method for providing a fire safe penetration in a building element, especially in a ceiling, floor or in a lightweight wall comprising a framework of profile elements and at least one outer covering being fixed to said profile elements. For providing a fire safe penetration in a building element, for example a lightweight building wall, in such a manner that the building element or insert can be easily manufactured and installed while guaranteeing the high requirements of flame and smoke resistance of such a building element or the insert, the invention proposes the following consecutive steps:

Figure 1:
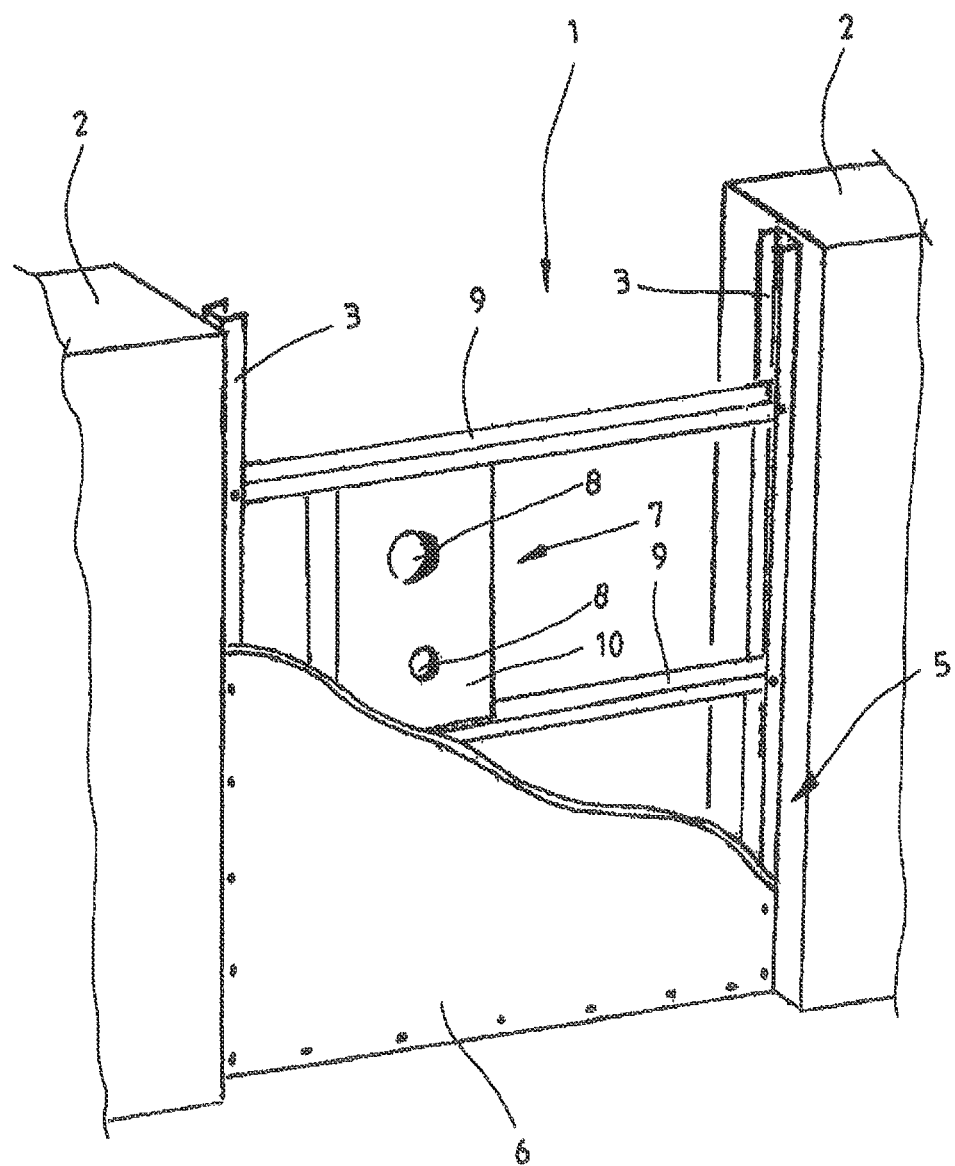

arranging an insert between the profile elements at a location for a pipe or conduit penetration in a way that the insert is arranged adjacently to the outer covering and is at least partly covered by the outer covering;

providing an opening in the outer covering and the insert for a pipe or conduit;

arranging the pipe or conduit through the outer covering and the insert and securing fire and/or smoke tightness between the pipe or conduit and the insert and/or outer covering.

12 Claims, 9 Drawing Sheets

(51) Int. Cl.
*F16L 5/04* (2006.01)
*H02G 3/04* (2006.01)
*H02G 3/22* (2006.01)
*F16L 5/02* (2006.01)

(56) References Cited

U.S. PATENT DOCUMENTS

| | | | | |
|---|---|---|---|---|
| 3,531,901 | A * | 10/1970 | Will, Jr. et al. | 52/309.14 |
| 4,109,423 | A * | 8/1978 | Perrain | 52/1 |
| 4,273,821 | A * | 6/1981 | Pedlow | 428/215 |
| 4,276,332 | A * | 6/1981 | Castle | 428/34.1 |
| 4,419,535 | A * | 12/1983 | O'Hara | 174/505 |
| 4,493,173 | A * | 1/1985 | Kohaut | 52/220.8 |
| 4,729,916 | A * | 3/1988 | Feldman | 428/182 |
| 4,936,064 | A * | 6/1990 | Gibb | 52/232 |
| 5,067,676 | A * | 11/1991 | Beele | 248/56 |
| 5,099,625 | A * | 3/1992 | Staudt | 52/232 |
| 5,194,192 | A * | 3/1993 | Seebode | 264/35 |

FOREIGN PATENT DOCUMENTS

| | | |
|---|---|---|
| DE | 20006076 U1 | 8/2001 |
| DE | 10147831 A1 | 9/2002 |
| EP | 2180107 A1 | 4/2010 |
| SE | WO0052278 * | 9/2000 |

* cited by examiner

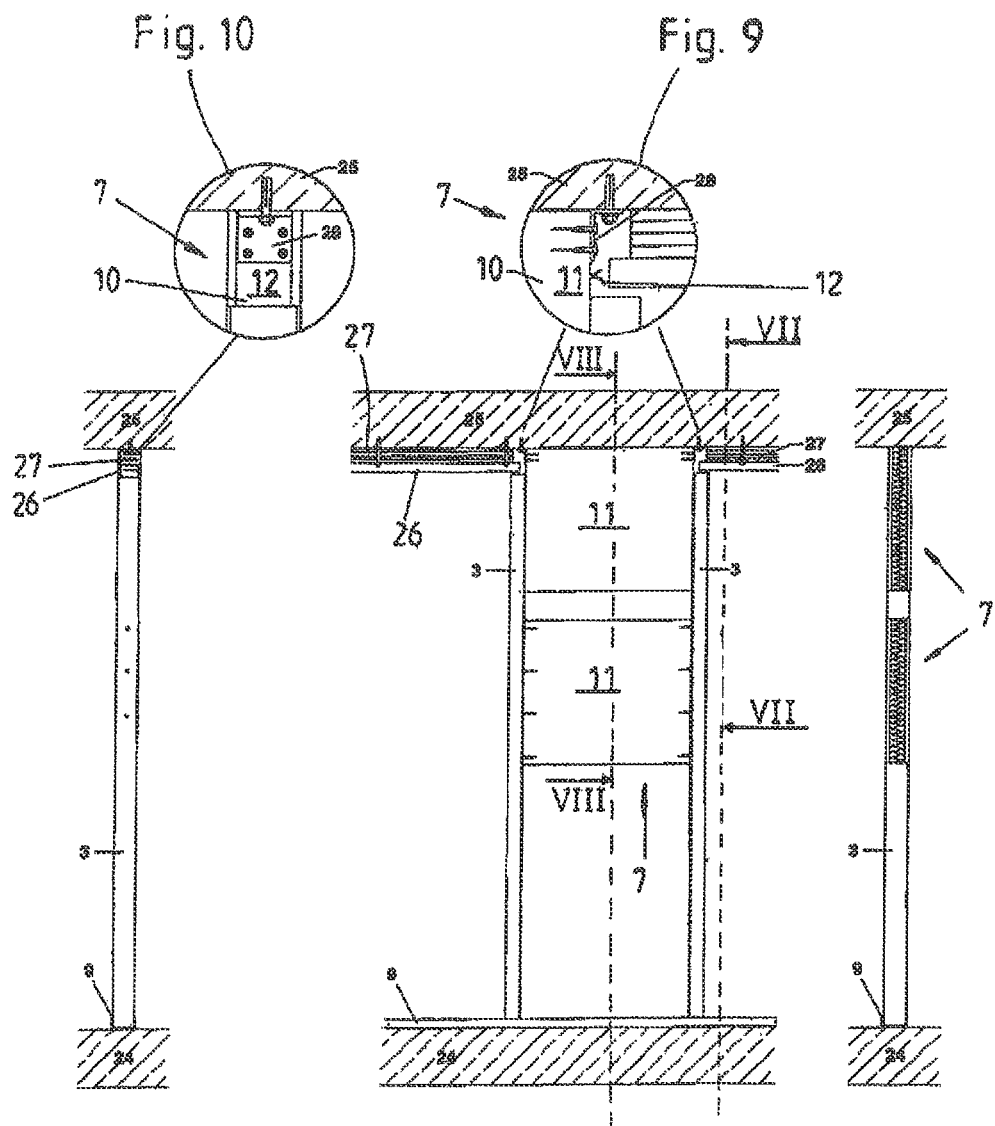

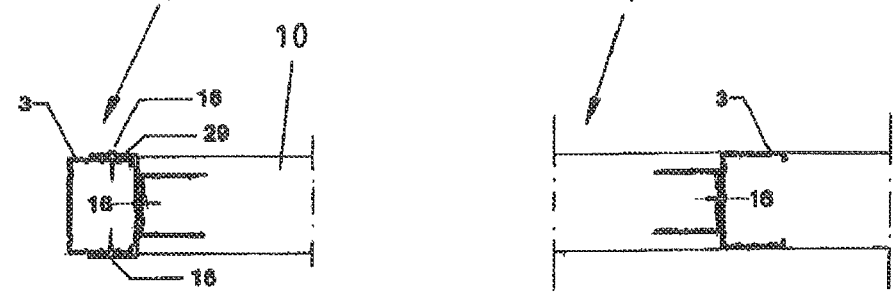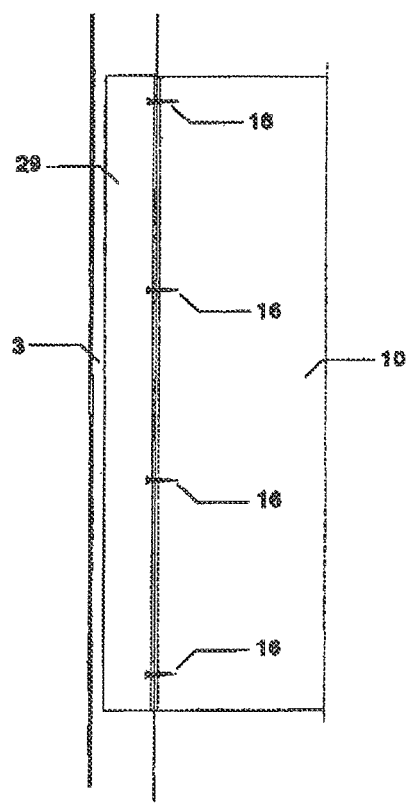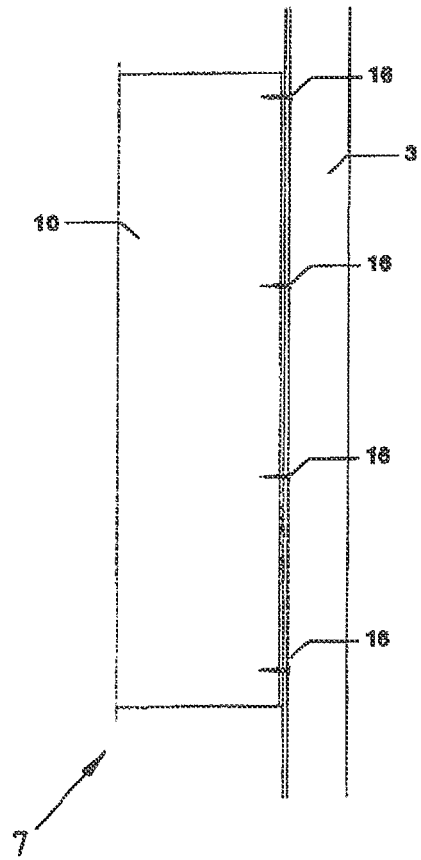

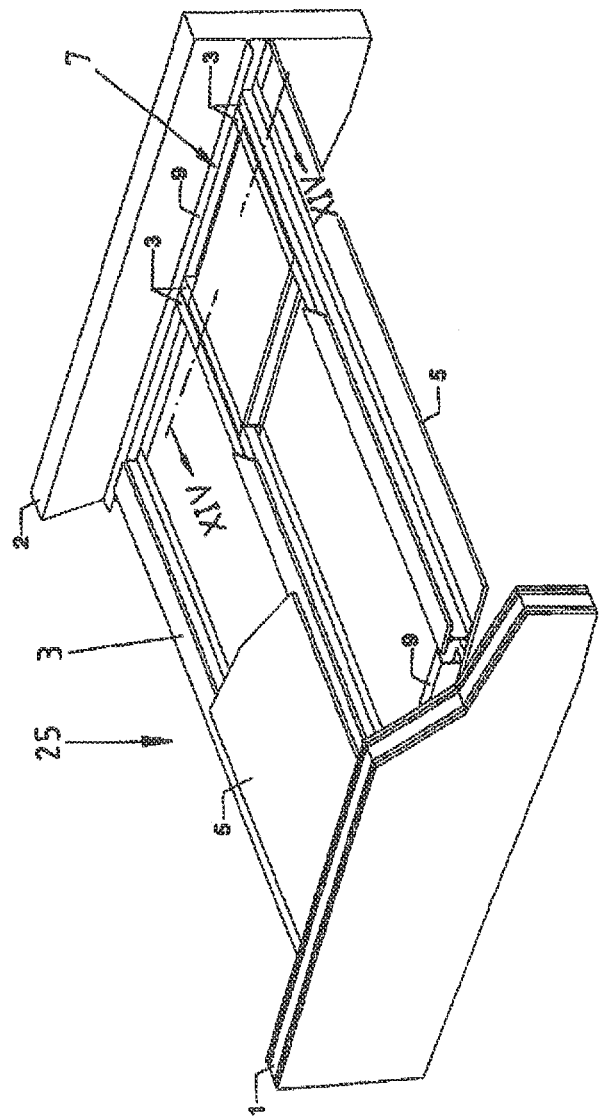

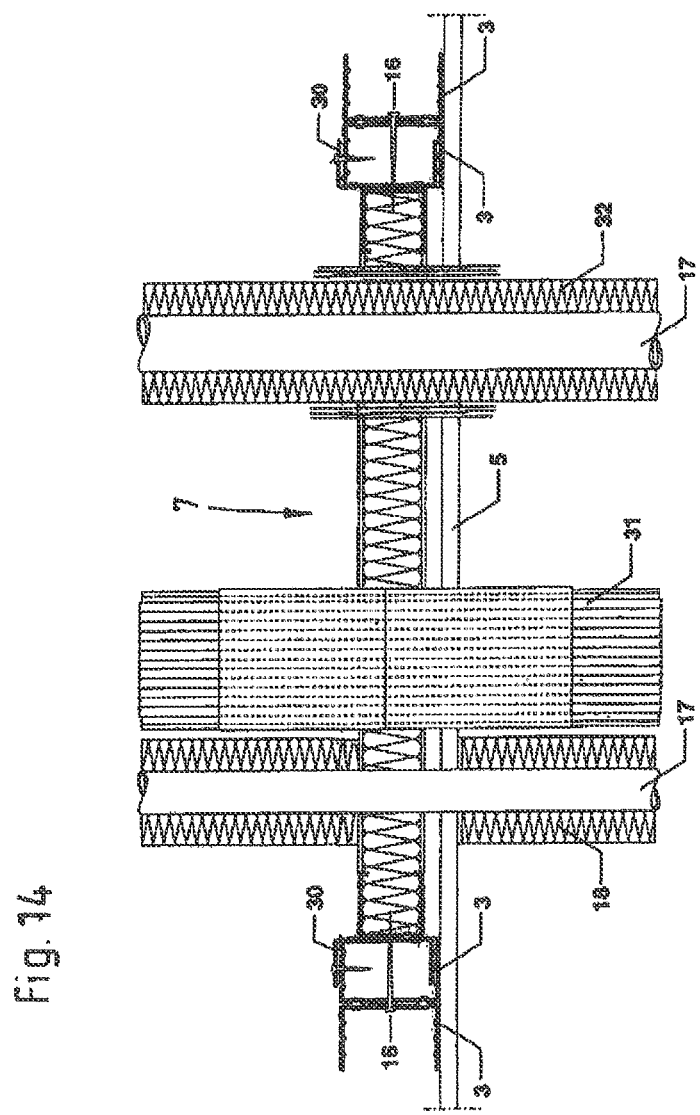

METHOD FOR PROVIDING A FIRE SAFE PENETRATION IN BUILDING ELEMENT

The invention relates to a method for providing a fire safe penetration in a building element, especially in a ceiling, a floor or in a lightweight wall comprising a framework of profile elements and at least one outer covering being fixed to said profile elements.

In buildings, walls are conventionally built up from single building blocks which are connected to each other using a hydraulically setting binder such as cement for example. In the interior area of buildings, the construction of building walls as lightweight walls or stud walls has proved increasingly beneficial. Lightweight walls or stud walls usually consist of metal profiles which are arranged oppositely to each other on a ceiling and floor of a building and have a U-shaped cross section serving to receive perpendicularly arranged vertical metal profile elements which partition the lightweight or stud wall into individual sections. Usually, the vertical profile elements are also U-shaped or C-shaped. But also different profile elements are known, for instance those having a W-shaped cross section.

The vertical profile elements are connected to the profiles arranged on the ceiling and on the wall of the building, particularly by screwing or by punching the profiles together by means of an appropriate tool. Thus individual compartments forming the sections are created between the profile elements and serve to receive insulation material, particularly from mineral fibers, in order to insulate the lightweight wall or stud wall against heat and/or sound transmission. Normally, the insulation materials are installed after the profiles and profile elements have been covered with plates on one side, particularly plasterboard plates. After the installation of the insulation material, a second covering with plasterboard can be fixed to the profiles and profile elements so that the insulation material is arranged between the two coverings. There are also known constructions in which the covering comprises multiple layers in order to cover for instance joint areas between adjacent plasterboard plates.

It is known that in addition to attach metal profile elements to the ceiling and floor it is also known to attach the first profile elements to opposing vertical walls and then having perpendicularly arranged other profile elements extending between the first two profile elements.

It is important to note that the present invention is not only relevant in relation to lightweight building walls as described above, but finds equally application in relation to other building elements, such as ceilings and floors having a similar structure comprising profile elements and at least one covering.

Energy conduits or conduits for carrying liquids or gases must be passed through such building elements. This normally requires the use of an insert that is to be installed in the building wall and particularly in the lightweight wall in order to precisely position the energy conduits or conduits for carrying liquids or gases and especially seal the penetration opening in such a manner that the finished building wall or lightweight wall meets the requirements of fire resistance. Hereby it is ensured that neither fire nor smoke can spread from one side of the wall to the other side. In this regard, prior art shows a great number of different constructions of such inserts.

WO 00/52278A1 discloses a wall penetration in a lightweight partition wherein a penetration opening is delimited by vertical profiles between the outer gypsum plates. After the pipes with pipe sections are arranged through the opening, the opening is filled with packed rock wool and the sides are closed by mortar or plaster.

Another wall penetration comprising a stone wool board is known from SE 411 610 B1. On each side of the stone wool board there is arranged a metal grid connected to a frame of metal profiles.

Finally, EP 1 591 597 A1 shows a wall penetration wherein a solid element of e.g. lightweight concrete is arranged in the area where pipes extend through the lightweight wall. The solid element can be secured to the metal studs of the wall. The front side of the solid element is flush with the surface of the gypsum boards.

All the above-mentioned constructions have drawbacks, e.g. are a complicated construction or require installation of elements in an already finished wall. These elements are difficult to insert into the lightweight partition wall because of different components which have to be inserted one after the other.

The invention is thus based on the object of designing a method for providing a fire safe penetration in a building element, for example a lightweight building wall, in such a manner that the building element or insert can be easily manufactured and installed while guaranteeing the high requirements of flame and smoke resistance of such a building element or the insert.

The solution of this object is provided by a method with the features of claim 1.

With the method according to the invention a fire safe penetration in a building element, for example a lightweight building wall, can be provided at a position where a pre-mounted insert is arranged between the profile elements and is at least partly covered by the covering.

Accordingly, with the method of the invention, a prefabricated insert can be directly mounted in the building element, particularly between two profile elements of a lightweight wall, without requiring additional or supplementary installation work. To this end the insert consists of a rigid plate of heat and/or sound insulation material which additionally is non-combustible according to class A2.

The insert which comprises two large surfaces which are parallel oriented in a plane and two side faces which are oriented at right angles to the large surfaces is thus block-shaped. It normally fills the complete thickness area between the coverings of a lightweight wall so that the coverings of the lightweight wall are arranged with only a small distance to the insert. If necessary, the hollow space formed by the distance between the coverings and the insert is filled with a thin mineral fiber web for improving the sound insulating power of a lightweight wall constructed out of it.

Preferably, the rigid plate of the insert consists of artificial resin-bound mineral fibers and has a bulk density of at least 150 kg/m$^3$. Such a mineral fiber plate is sufficiently rigid and keeps its rigidity even if for example bores are made in the plate for the passage of energy conduits and/or conduits for carrying liquids or gases. Incidentally, such a mineral fiber plate exhibits excellent heat and/or sound insulation properties so that any additional heat and/or sound insulation in this area, namely in the area of the installed insert, is unnecessary.

According to a further feature of the invention a plate can be used comprising a cover on each of at least two mutually parallel extending side faces, the cover being preferably made up from rigid profiles and serving for fixing the plate to the profile elements. The rigid plate accordingly includes reinforcing elements in the region of at least two mutually opposite side faces. These reinforcing elements are preferably formed as L- or U-shaped profiles which are applied against the large surfaces with at least one leg and against the side faces with a second leg thereof, so that not only the side face of the plate is fully covered, but partially also the large surfaces which extend parallel to each other.

The profile elements can be fixed to the plate by clamping. Connecting the profile elements to the plate by bonding has proven very effective in practical use, but care must be taken that an adhesive is used for this purpose which does not burden the insert with regard to fire. Of course, this can also be achieved by reducing the amount of the adhesive.

Inserts which are designed in this way can be easily installed for example in the profile elements of the lightweight wall and screwed to them, without damaging the plate from artificial resin-bound mineral fibers in its rim area.

A further development of the method of the invention provides a building element having the plate in a sandwich design and including in addition to a layer of mineral fibers at least one layer of a plasterboard plate or a cement-bound building material. Preferably, in addition to the mineral fiber plate the insert includes in the region of the two large surfaces of the mineral fiber plate a respective layer of a plasterboard plate or a cement-bound building material. This construction serves to improve the bending stiffness of the insert and particularly also its mounting in lightweight walls. These layers of plasterboard plates or cement-bound materials substantially increase the stability of the insert so that also mineral fiber plates are used which for example have a bulk density lower than the above-stated bulk density. Incidentally, this construction does not necessarily require the side faces of the plate to be covered with a profile element in order to improve its mounting in the lightweight wall.

A further feature of the method provides a building element having an insert being screwed together with at least one profile element. Preferably, the insert has edge lengths of 610 mm to 635 mm, in particular 625 mm and 305 mm to 315.25 mm, in particular 312.5 mm. The profile elements of a lightweight wall are usually arranged at a distance of 625 mm or at a distance of 312.5 mm. An insert having the above-mentioned edge lengths can be mounted in the usual lightweight partitions without previous cutting to size, because it can be arranged with its horizontally oriented longer edge between two profile elements spaced by 625 mm or with its vertically oriented longer edge between two profile elements spaced by 312.5 mm.

For improving the method of the invention it is further provided that the insert is laminated with a flat metal element, in particular with an aluminum foil. This metal element has the particular advantage that the plate from artificial resin-bound mineral wool fibers is protected against damage and trickling out of individual mineral fibers. This even applies if the bores which have to be provided for receiving energy conduits or conduits for carrying liquids or gases are made after the mounting of the insert in the building elements. The flat metal element additionally performs heat insulation functions.

Finally, for improving a building element it is provided that the insert includes in the regions of its two side faces, which extend perpendicularly in their installed position, L-shaped fixing elements comprising two legs which are oriented at right angles to each other, one leg being connected to the insert and the second leg being connectible to the floor or to the ceiling of the building, particularly by screwing. In this way, the insert can be used also in areas where a profile element for fixing the insert in the building wall is not available. This applies especially to the region of a sliding ceiling connection in which the insert must be arranged directly below the ceiling of the building.

The statements made above with respect to the building element of course fully apply also to the insert and it has to be clear that the insert guides the pipe and/or the conduit through the wall.

According to the before described features of the insert and the building element the method of providing a fire safe pipe penetration in the lightweight building element comprising profile elements and at least one outer covering being fixed to at least one profile element, comprises the consecutive steps of arranging an insert between the profile elements at a location for pipe or conduit penetration in a way that the insert is arranged adjacently to the outer covering and is at least partly covered by the covering, providing an opening in the outer covering and/or the insert for a pipe or conduit, arranging the pipe or conduit through the covering and/or the insert and securing fire and/or smoke tightness between the pipe or conduit and the insert and/or covering. Therefore the insert guides the conduit and/or the pipe through the wall.

The method according to the invention has the big advantage that the insert can be fixed as a prefabricated element into a building element, e.g. a lightweight building wall. By using a prefabricated insert the time to build up such a building element is reduced. In the same way the costs of such a building element can be reduced by reducing the labor for building up the building element and by reducing the elements being used for building up the building element.

In a first step after at least two profile elements are fixed to the building the insert can be arranged in a predetermined position between the profile elements. The insert is fixed to these profile elements by using screws. The predetermined position is dependent on the location for a pipe or conduit penetration through the building element. After fixing the insert to the profile elements at least one side of the building element can be covered with an outer covering which at least partly covers the insert. Normally the insert will be covered on both sides in total by two coverings.

Of course the covering on one side can be fixed to the profile elements before the insert is arranged between the profile elements and fixed to these profile elements and/or the covering by screwing and/or glueing. Nevertheless it has to be taken into account that glueing of the insert to the covering may reduce the noncombustibility of the whole construction. Therefore to use screws for fixing the insert to the profile elements and/or the covering is the preferred embodiment of the invention.

After the insert is fixed in the predetermined position and at least covered by one covering an opening in the outer covering and the insert for a pipe or conduit is drilled. This opening is used to arrange the pipe or conduit through the covering and the insert. Finally the distance between the outer diameter of the pipe or conduit and the inner diameter of the opening is filled up with noncombustible material which makes this distance fire and/or smoke tight.

All statements made above with respect to the building element, especially the lightweight building wall, and/or the insert of course fully apply also to the before mentioned described method for providing a fire safe pipe penetration in the building element, especially the lightweight building wall.

Further features and advantages of the invention will become apparent from the following description of the attached drawings showing preferred embodiments of the invention.

Figure 2:
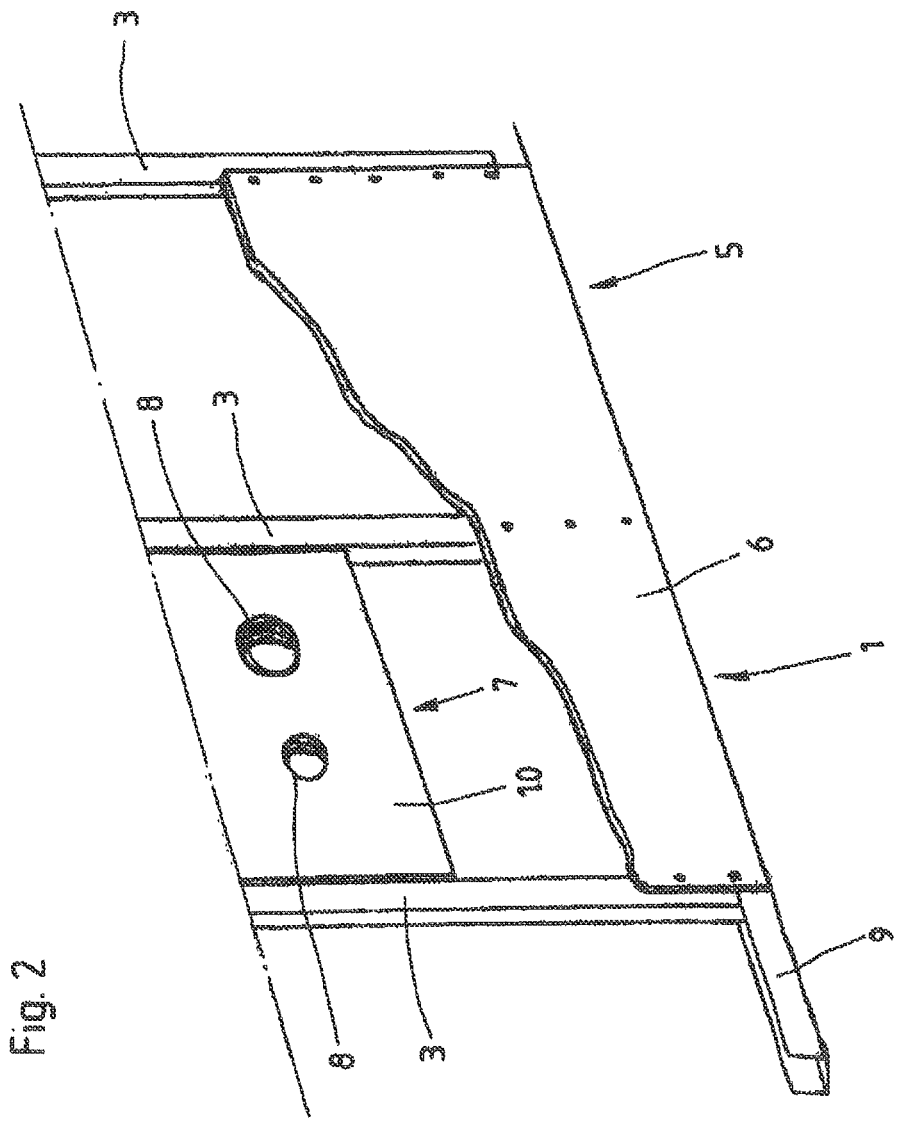
Figure 3:
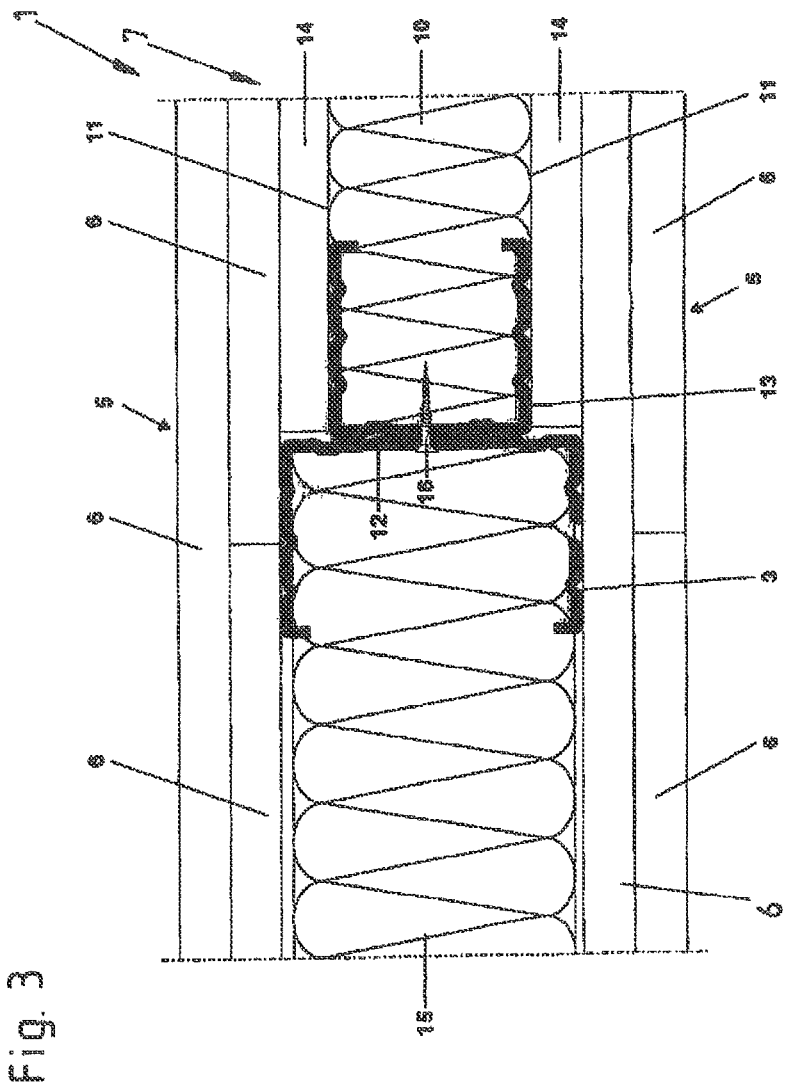
Figure 4:
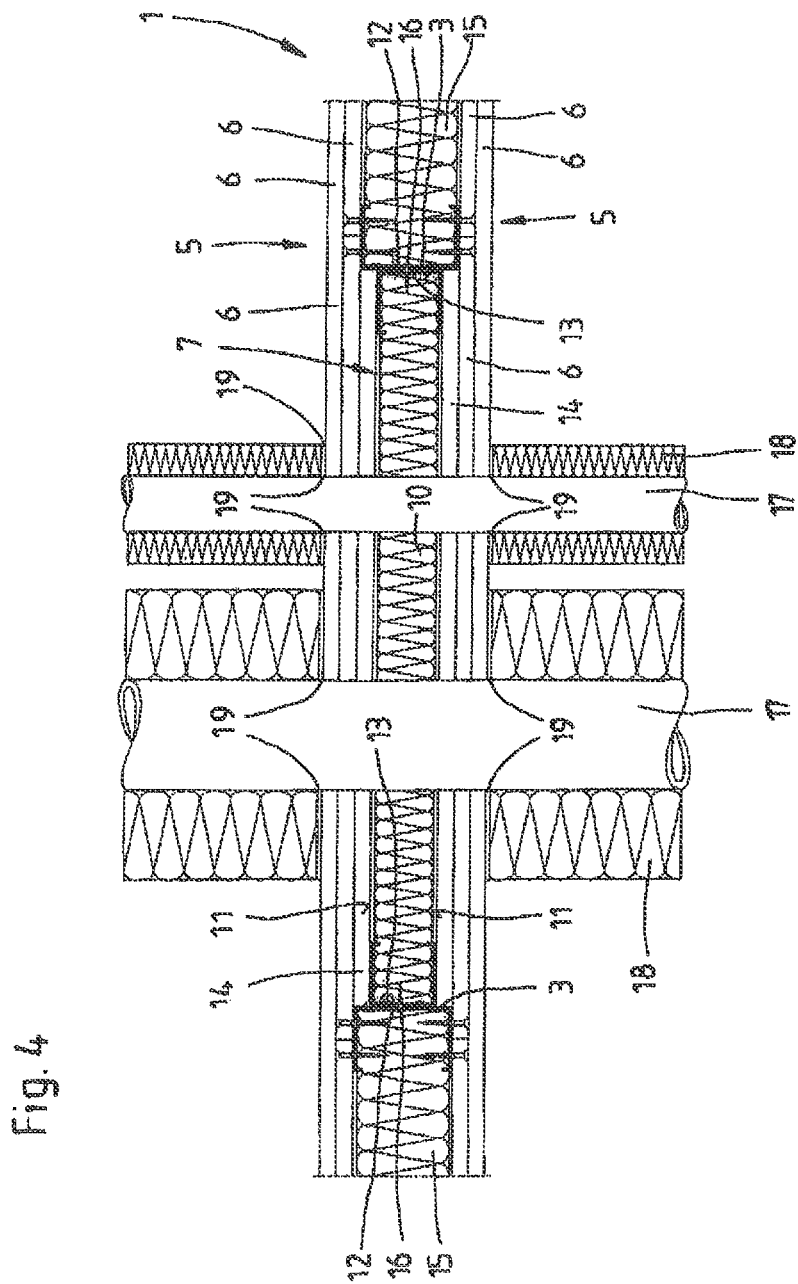
Figure 5:
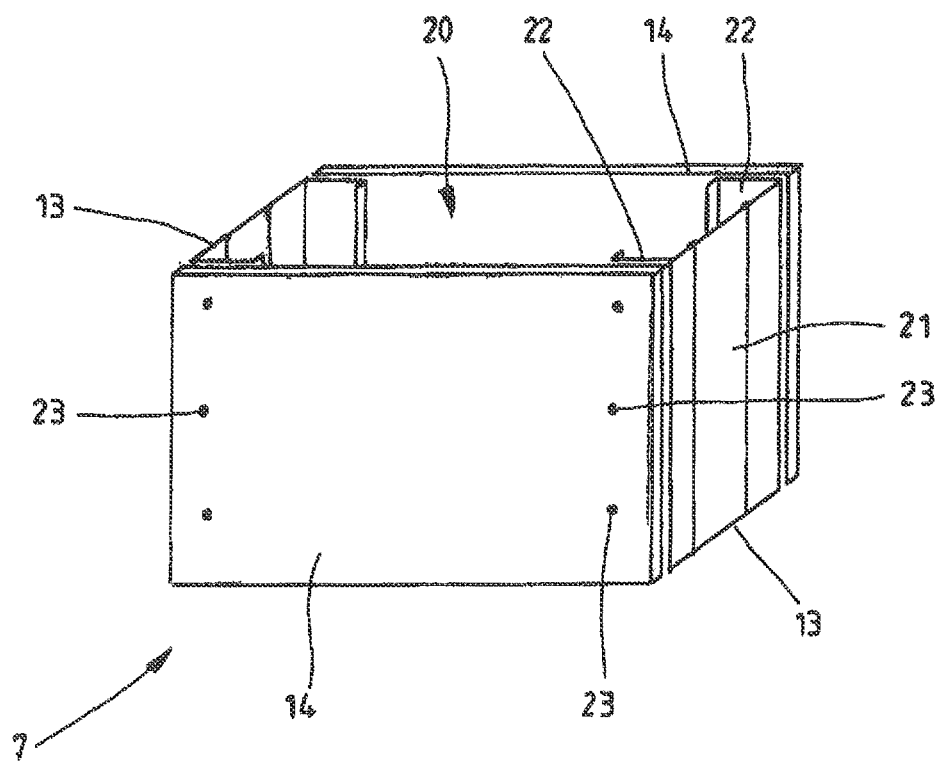

In the drawings it is shown by:

FIG. 1 a first embodiment of a lightweight wall in a perspective view;

FIG. 2 a second embodiment of a lightweight wall in a perspective view;

FIG. 3 a part of a lightweight wall in top view;

FIG. 4 a part of a lightweight wall including an insert, in top view;

FIG. 5 an insert for use in a lightweight wall according to FIG. 4;

FIG. 6 a view of a clipping of a lightweight wall;

FIG. 7 the lightweight wall according to FIG. 6 in a sectional side view taken along cutting line VII-VII in FIG. 6;

FIG. 8 the lightweight wall according to FIG. 6 in a sectional side view taken along cutting line VIII-VIII in FIG. 6;

FIG. 9 the lightweight wall according to FIG. 6 in a detailed view;

FIG. 10 the lightweight wall according to FIG. 6 in a lateral view according to line X-X in FIG. 9;

FIG. 11 a view of a further embodiment of a lightweight wall;

FIG. 12 the lightweight wall according to FIG. 11, in top view.

FIG. 13 the third embodiment of a building element in a perspective view; and

FIG. 14 the building element according to FIG. 13 in a lateral view according to the line XIV-XIV in FIG. 13.

FIG. 1 illustrates a building element in the form of a lightweight wall 1 arranged between two mutually spaced construction members 2 and comprises two profile elements 3 which are attached to the construction members 2. Profile elements 9 are arranged between and extending at right angles to the profile elements 3. The profile elements 3, 9 have a U-shaped cross section and the profile elements 3 are in the shown embodiment screwed together with the construction members 2 in such a manner that the free legs of the profile elements 3 point toward each other.

The lightweight wall 1 further includes a covering 5 which consists of a plasterboard plate 6 and which is screwed together with the profile elements 3. A similar covering will be mounted on the opposite side of the lightweight wall 1.

The lightweight wall 1 further includes an insert 7 for receiving and guiding energy conduits and/or conduits for carrying liquids or gases. The insert 7, the construction of which will be more clearly described in the following with reference to the FIGS. 3 and 4, consists of a rigid plate 10 made of heat and/or sound insulation material. The insert 7 is noncombustible according to fire class A2.

It can be seen in FIG. 1 that the insert 7 has bores 8 serving to receive the above-mentioned conduits in a fire and smoke tight manner. These bores 8 are usually made after the mounting of the insert 7 in the lightweight wall so that the same are arranged in dependence of the run of these energy conduits or conduits.

FIG. 2 shows a lower part of a lightweight wall 1 and the mounting of the insert 7 according to FIG. 1 between two vertically extending profile elements 3. In addition, FIG. 2 shows a profile element 9 which has a U-shaped cross section and which is screw-fixed to the floor of a building not further shown. On the opposite side of the profile element 9, a further profile element which is not further illustrated is provided. This profile element is connected to the ceiling of the building so that the profile elements 3 extend between the profile element 9 and the profile element which is arranged in the region of the ceiling of the building and which is not further illustrated. In a lightweight wall 1 which is designed according to FIG. 2, the profile elements 3 are arranged at a distance which substantially corresponds to an edge length of the insert 7.

The FIGS. 3 and 4 show parts of corresponding lightweight walls 1 in top view, and in FIG. 3 especially the connection of the insert 7 to a profile element 3 can be seen.

The insert 7 according to FIG. 3 includes a plate 10 of resin-bound mineral fibers, particularly rock wool fibers, the plate 10 preferably having a bulk density of 180 kg/m$^3$ and thus being rigid. The plate 10 includes two large surfaces 11 which extend parallel to each other and four side faces 12, only one of them is shown in FIG. 3. The side faces 12 are oriented at right angles to the large surfaces 11.

In the region of the side faces 12 which extend parallel to the profile elements 3, profiles 13 of metal are arranged which have a U-shaped cross section and which rest with their two legs on the large surfaces 11 of the plate 10. The two legs are bent toward each other so that the plate 10 is held in these profiles 13 in a form and force-fit fashion.

In the shown embodiment the insert 7 further includes on both sides of the plate 10 plasterboard plates 14 which are coextensive with the plate 10 and which are connected to the legs of the profile 13.

FIG. 3 further shows a heat insulation layer 15 which is arranged between two coverings 5 of the lightweight wall 1. The heat insulation layer 15 extends between the legs of the profile element 3 up and into the profile element 3 and consists of web-like or plate-like mineral fiber batts or mats, generally of low density, such as 20-45 kg/m$^3$, as is conventional for lightweight walls.

The insert 7 is screwed together with the profile element 3. To this end, screws 16 are provided which penetrate through the webs of the profile element 3 and the profile 13. These screws 16 are of course mounted before the insulation layer 15 is arranged.

FIGS. 3 and 4 finally show the design of the covering 5 which consists of plasterboard plates 6 arranged in two layers. The plasterboard plates 6 within two layers are arranged in such manner that joints formed between adjacent plasterboard plates 6 of the inner layer are overlapped by the outer layer of the plasterboard plates 6.

According to FIG. 4 showing a top view of the overall insert 7 after the installation of the conduits, the plasterboard plates 6 of the covering 5 are screwed together with the profile elements 3.

Supplementary to FIG. 3, FIG. 4 shows the lightweight wall 1 with penetrating conduits 17 which are surrounded by heat and fire insulating pipe sections 18 which abut on the outer plasterboard plate 6 of the coverings 5 and which are sealed against the coverings 5 under the interposition of a fire protection cement 19. The insert 7 guides the conduits 17 through the wall 1.

FIG. 5 shows a part of an embodiment of the insert 7 comprising two mutually spaced and mutually parallel oriented profiles 13 and plasterboard plates 14 screwed to these profiles 13. The plasterboard plates 14 are also spaced to each other and extend parallel to each other so that a hollow space 20 is formed between the profiles and the plasterboard plates 14 which serves to receive the plate 10 which is not illustrated in FIG. 5. The profiles 13 have a U-shaped cross section and comprise a web 21 and two legs 22 extending at right angles to the web 21. The legs 22 are angled toward each other on their free ends so that these angled parts engage in the plate 10 after the plate 10 is installed.

The plasterboard plates 14 are screwed together with the legs 22 of the insert 7 using screws 23. The screws 23 which extend as far as up and into the hollow space 20 also serve for fixing after engaging in the plate 10.

The insert 7 shown in FIG. 5 is prefabricated in such a manner that the insert 7 including the plate 10 which is not further illustrated in FIG. 5 can be mounted in a building element, such as a lightweight wall 1, a ceiling or a floor, without additional preparation work, for example by screwing the webs 21 together with the profile elements 3, e.g. as shown in FIGS. 3 and 4.

In a preferred embodiment the insert 7 has an edge length of 312.5 mm extending parallel to the profiles 13 and an edge length of 625 mm between spaced profiles 13. Due to this construction, the insert 7 can be mounted both in a usual arrangement of the profile elements 3 at a distance of 62.5 cm and in a usual arrangement of the profile elements 3 at a distance of 31.25 cm, by mounting and screw-fixing the insert 7 corresponding to the spacing between the profile elements 3.

The shorter distance between the profile elements 3 is always chosen if a higher stability of the lightweight wall 1 is required, for instance in the area of sanitary rooms in which the profile elements 3 of a lightweight wall 1 are required to support additional sanitary installations like cisterns, washing basins, toilet basins or the like. Moreover, the shorter distance between the profile elements 3 is partly also prescribed for reasons of fire protection.

FIGS. 6 to 10 show a further construction of a building element in the form of a lightweight wall 1 between a floor 24 and a ceiling 25 of a building. In FIGS. 6, 7 and 8 two inserts 7 between two perpendicularly oriented profile elements 3 can be seen. The profile elements 3 are screwed together with a profile element 9 in the area of the floor 24 of the building.

The lower insert 7 in FIGS. 6-8 is screwed together with the profile elements 3 in the manner described above with reference to FIGS. 3 and 4.

If the lightweight wall is of the type that is not fixed to the ceiling 25, in order to allow the ceiling to move vertically due to load on top of the ceiling 25, special measures should be taken, since the piping and conduits most often are suspended from the ceiling 25. Conventionally, the profile element 26 is connected to the ceiling 25 of the building under the interposition of a plasterboard strip 27. The profile element 3 terminates with a distance to the ceiling 25 of the building and is not fixed to the profile element 26, thereby allowing the profile element 26 to move vertically with the ceiling 25. To be able to connect the upper insert 7 flush with the ceiling 25 of the building, the upper insert 7 includes on its side faces 12 two L-shaped angle elements 28 which are screwed together with one leg on the side face 12 of the plate 10 and with one leg on the ceiling 25 of the building. By attaching the upper insert 7 directly to the ceiling 25 the upper insert 7 moves with the ceiling 25, which ensures that any pipes or conduit suspended from the ceiling 25 and extending through the upper insert 7 maintain their structural integrity with the insert 7.

FIGS. 11 and 12 illustrate once again and in detail the mounting of the insert 7 between the two profile elements 3. It can be seen particularly in FIG. 12, that the profile elements 3 of the lightweight wall 1 are normally arranged in alignment with each other, i.e. the legs of the adjacent profiles 3 point in mutually corresponding directions to that the openings of the profile elements 3 which are suitable for receiving a heat insulation layer 15 due to their U-shaped cross section are aligned corresponding to each other. However, to be able to connect the insert 7 to the profile elements in an easy manner, the mounting of an additional profile 29 in a profile 3 has proven to be very effective, thus forming a profile having a square cross section, with the legs of the profile 3 which are arranged on top of each other and the profile element 29 being screwed together. Then the insert 7 according to the above description is screwed together with the web between the legs of the profile element 29.

The profile element 29 is preferably prefabricated together with the insert 7 so that the insert 7 together with the profile element 29 is mounted and screw-fixed to the previously erected profile elements 3.

In FIG. 11 it can also be seen that the profile element 29 has a length which corresponds to the edge length of the insert 7.

FIG. 13 shows a third embodiment of a building element in form of a ceiling 25 of a building. The ceiling 25 is arranged between a lightweight wall 1 as described before and a wall being the construction member 2 which for example consists of bricks and/or mortar.

Horizontally arranged profile elements 9 are fixed to the lightweight wall 1 and the construction member 2. Profile elements 3 are protruding between these profile elements 9.

The profile elements 3 are arranged in equal distances from each other whereas the distance between two profile elements 3 is equal to the length of an insert 7 which is inserted in the space between two profile elements 3.

As can be seen from FIG. 14 the insert 7 is fixed by screws 16 to profile elements 30 whereas two profile elements 30 of c-shaped cross section are fixed to each other by screws 31. The combination of the two profile elements 30 on each side of the insert 7 is fixed to the profile elements 3 by the screws 16 passing through the profile element 3, the combination of the profile elements 30 and being fixed into the insert 7.

FIG. 14 shows two conduits 17 passing through the insert 7 and being insulated by a pipe section 18 or a pipe section 32 penetrating the insert 7 and covering 5 being fixed on the downside of the profile elements 3.

A further covering 5 which can be seen in FIG. 13 is arranged on top of the profile elements 9 and the profile elements 3. The pipe section 32 penetrates this covering 5, too.

In contrary to the pipe section 32 the pipe section 18 does not penetrate the insert 7 and the coverings 5 so that this pipe section 18 is arranged close to the coverings 5 or the insert 7.

Finally FIG. 14 shows a bundle 31 of cables which penetrates the coverings 5 and the insert 7.

The construction of the insert 7 according to FIGS. 13 and 14 corresponds to the inserts 7 as previously described.

The invention has been exemplified by reference to the drawings showing building elements in the shape of a lightweight wall or a ceiling. However, the invention is equally applicable to a building floor having a similar structure comprising profile elements and at least one covering.

LIST OF REFERENCE NUMBERS 1 lightweight wall
2 construction members
3 profile element
5 covering
6 plasterboard plate
7 insert
8 bore
9 profile element
10 plate
11 large surface
12 side face
13 profile
14 plasterboard plate
15 heat insulation layer
16 screw 17 conduit
18 pipe shell
19 fire protection cement
20 hollow space
21 web
22 leg
23 screw
24 floor of the building
25 ceiling of the building
26 profile element
27 plasterboard strip
28 angle element
29 profile element

The invention claimed is:

1. A method for providing a fire safe pipe penetration in a building element, especially in a ceiling, a floor or in a lightweight building wall comprising a framework of profile elements and at least one outer covering, being fixed to said profile elements, said method comprising:

arranging a pre-fabricated insert between the profile elements at a location for a pipe or conduit penetration in a way that the insert is arranged adjacently to the outer covering and is at least partly covered by the outer covering and wherein the pre-fabricated insert comprises a rigid plate of a noncombustible heat insulation material, a sound insulation material or both a heat insulation material and a sound insulation material, the rigid plate having two large surfaces which are parallel to each other, side faces which are oriented at right angles to the large surfaces and a cover made up from rigid profiles and serving for fixing the rigid plate to the profile elements of the framework as reinforcing elements in a region of at least two mutually opposite side faces of the side faces, formed as L- or U-shaped profiles which are applied against at least one of the large surfaces with at least one leg and against the region of the at least two mutually opposite side faces with a second leg thereof and wherein said pre-fabricated insert is capable of receiving and guiding energy conduits and/or conduits for carrying liquids or gases and further wherein the heat insulation material, sound insulation material or both heat insulation material and sound insulation material is noncombustible according to class A2;

providing an opening in the outer covering and the insert for a pipe or conduit after arranging the pre-fabricated insert between the profile elements;

inserting the pipe or conduit through the opening in the outer covering and the insert and securing fire and/or smoke tightness between the pipe or conduit and the insert and/or outer covering.

2. The method according to claim 1, wherein said rigid plate consists of artificial resin-bound mineral fibers and has a bulk density of at least 150 kg/m$^3$.

3. The method according to claim 1, wherein said pre-fabricated insert is designed in a sandwich-like fashion and includes in addition to the rigid plate at least one layer of a plasterboard plate or a cement-bound construction material.

4. The method according to claim 1, wherein said pre-fabricated insert has edge lengths of 610 mm to 635 mm and 305 mm to 315.25 mm.

5. The method according to claim 1, wherein said pre-fabricated insert is laminated with a flat metal element.

6. The method according to claim 1, wherein said pre-fabricated insert is screwed together with at least one profile element.

7. The method of claim 1, wherein said building element is a lightweight building wall and wherein said pre-fabricated insert in the region of its two side faces which extend perpendicularly in the installed position is designed with two L-shaped fixing elements having two legs which are oriented at right angles to each other, one of these legs being connected to said pre-fabricated insert and the second leg being connected to the floor or the ceiling of the building.

8. The method according to claim 3, wherein said rigid plate consists of artificial resin-bound mineral fibers and has a bulk density of at least 150 kg/m$^3$.

9. The method according to claim 2, wherein the two large surfaces of said pre-fabricated insert are oriented in a plane parallel to said outer covering, wherein the side faces of the pre-fabricated insert are oriented at right angles to said outer covering.

10. The method according to claim 3, wherein said pre-fabricated insert is laminated with a flat metal element.

11. The method according to claim 7, wherein one of the legs is connected to said insert by screwing and/or the second leg is connected to the floor or the ceiling of the building by screwing.

12. The method according to claim 5, wherein said flat metal element is aluminum foil.

* * * * *